(12) United States Patent
Kong et al.

(10) Patent No.: US 10,979,854 B2
(45) Date of Patent: Apr. 13, 2021

(54) EXTENDING A RADIO MAP

(71) Applicant: Apple Inc., Cupertino, CA (US)

(72) Inventors: Wei Kong, Cupertino, CA (US);
Robert Mayor, Half Moon Bay, CA (US); Chun-Yuan Yang, San Jose, CA (US); Darin Tay, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/710,568

(22) Filed: Sep. 20, 2017

(65) Prior Publication Data

US 2018/0352379 A1     Dec. 6, 2018

Related U.S. Application Data

(60) Provisional application No. 62/514,239, filed on Jun. 2, 2017.

(51) Int. Cl.
| | | |
|---|---|---|
| *H04W 4/02* | (2018.01) | |
| *G01S 5/02* | (2010.01) | |
| *G01C 21/20* | (2006.01) | |
| *H04W 4/029* | (2018.01) | |
| *H04W 4/33* | (2018.01) | |

(52) U.S. Cl.
CPC ......... *H04W 4/025* (2013.01); *G01C 21/206* (2013.01); *G01S 5/0252* (2013.01); *G01S 5/0263* (2013.01); *H04W 4/029* (2018.02); *H04W 4/33* (2018.02)

(58) Field of Classification Search
CPC ......... H04W 64/00; H04W 8/24; H04W 4/33; H04W 4/90; G01C 21/32; G01C 21/3694; G01C 21/206; H04M 1/72572; G01S 5/0252; G01S 5/0263
See application file for complete search history.

(56) References Cited

U.S. PATENT DOCUMENTS

| | | | |
|---|---|---|---|
| 6,842,726 B1 * | 1/2005 | Scharosch | H04W 16/18 |
| | | | 455/446 |
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |

(Continued)

FOREIGN PATENT DOCUMENTS

| | | |
|---|---|---|
| WO | WO 2010/101551 | 9/2010 |
| WO | WO 2011/144967 | 11/2011 |

(Continued)

OTHER PUBLICATIONS

International Search Report and Written Opinion in International Application No. PCT/US2018/031749, dated Oct. 5, 2018, 14 pages.

*Primary Examiner* — Charles N Appiah
*Assistant Examiner* — Frank E Donado
(74) *Attorney, Agent, or Firm* — Jaffery Watson Mendonsa & Hamilton LLP

(57) ABSTRACT

A method comprising: receiving a radio map of an indoor venue using survey data collected by a survey device positioned throughout the venue, the radio map including a boundary; obtaining harvest data that correspond to locations that are outside of the boundary; filtering the harvest data; and extending the radio map using the survey data and the filtered harvest data, wherein the extended radio map is defined at least in part by an extension of the boundary.

20 Claims, 8 Drawing Sheets

(56) References Cited

U.S. PATENT DOCUMENTS

| | | |
|---|---|---|
| 8,054,219 B2 | 11/2011 | Alizadeh-Shabdiz |
| 8,223,074 B2 | 7/2012 | Alizadeh-Shabdiz |
| 8,340,691 B1 | 12/2012 | Starenky et al. |
| 8,369,264 B2 | 2/2013 | Brachet et al. |
| 8,478,297 B2 | 7/2013 | Morgan et al. |
| 8,694,366 B2 | 4/2014 | Barnes, Jr. |
| 8,775,065 B2 | 7/2014 | Gupta et al. |
| 8,836,580 B2 | 9/2014 | Mendelson |
| 8,866,673 B2 | 10/2014 | Mendelson |
| 8,896,485 B2 | 11/2014 | Mendelson |
| 8,941,485 B1 | 1/2015 | Mendelson |
| 8,965,688 B2 | 2/2015 | Bandyopadhyay et al. |
| 8,983,493 B2 | 3/2015 | Brachet et al. |
| 9,020,687 B2 | 4/2015 | Mendelson |
| 9,125,019 B1 | 9/2015 | Heikkila et al. |
| 9,148,764 B2 | 9/2015 | Das et al. |
| 9,204,251 B1 | 12/2015 | Mendelson |
| 9,204,257 B1 | 12/2015 | Mendelson |
| 9,301,100 B1 | 3/2016 | Jampani et al. |
| 9,304,970 B2 | 4/2016 | Wirola et al. |
| 9,432,813 B2 | 8/2016 | Ahn et al. |
| 9,584,981 B2 | 2/2017 | Noorshams et al. |
| 9,641,814 B2 | 5/2017 | Wirola et al. |
| 9,733,088 B2 | 8/2017 | Sen et al. |
| 1,047,760 A1 | 11/2019 | Yang et al. |
| 2007/0001904 A1 | 1/2007 | Mendelson et al. |
| 2008/0077326 A1 | 3/2008 | Funk et al. |
| 2009/0191897 A1* | 7/2009 | Johnson ............... H04W 4/029 455/456.3 |
| 2011/0077862 A1 | 3/2011 | Huang et al. |
| 2011/0112768 A1 | 5/2011 | Doyle |
| 2011/0274000 A1 | 11/2011 | King et al. |
| 2012/0064855 A1 | 3/2012 | Mendelson |
| 2012/0143495 A1 | 6/2012 | Dantu et al. |
| 2012/0203453 A1 | 8/2012 | Lundquist et al. |
| 2012/0245839 A1 | 9/2012 | Syed et al. |
| 2013/0150076 A1 | 6/2013 | Kim et al. |
| 2013/0151139 A1 | 6/2013 | Park et al. |
| 2013/0179075 A1 | 7/2013 | Haverinen et al. |
| 2013/0184012 A1 | 7/2013 | Gupta et al. |
| 2013/0336138 A1* | 12/2013 | Venkatraman ........ G01S 5/0278 370/252 |
| 2014/0073345 A1 | 3/2014 | Chintalapudi |
| 2014/0107918 A1 | 4/2014 | Friedler et al. |
| 2014/0114561 A1 | 4/2014 | Pakzad |
| 2014/0128100 A1 | 5/2014 | Sridhara et al. |
| 2014/0162693 A1 | 6/2014 | Wachter et al. |
| 2014/0171098 A1 | 6/2014 | Marti et al. |
| 2014/0171114 A1 | 6/2014 | Marti |
| 2014/0213294 A1 | 7/2014 | Marti et al. |
| 2014/0213298 A1 | 7/2014 | Marti et al. |
| 2014/0235266 A1 | 8/2014 | Edge et al. |
| 2014/0274136 A1 | 9/2014 | Edge et al. |
| 2014/0324590 A1 | 10/2014 | Kong et al. |
| 2014/0335887 A1 | 11/2014 | Liu |
| 2014/0335893 A1 | 11/2014 | Ronen et al. |
| 2014/0335900 A1 | 11/2014 | Farris |
| 2014/0355592 A1* | 12/2014 | Camps ................. H04W 24/08 370/338 |
| 2014/0361927 A1 | 12/2014 | Jarvis et al. |
| 2015/0043362 A1 | 2/2015 | Sankar et al. |
| 2015/0045054 A1* | 2/2015 | Emadzadeh .......... H04W 4/043 455/456.1 |
| 2015/0052460 A1 | 2/2015 | Mohammad Mirzaei et al. |
| 2015/0080020 A1* | 3/2015 | Edge ..................... G01S 5/0236 455/456.1 |
| 2015/0195682 A1 | 7/2015 | Lee et al. |
| 2015/0245180 A1 | 8/2015 | Lin et al. |
| 2015/0271632 A1* | 9/2015 | Venkatraman .......... G01S 19/48 455/456.2 |
| 2015/0281910 A1 | 10/2015 | Choudhury et al. |
| 2015/0296342 A1 | 10/2015 | Boukallel et al. |
| 2015/0308839 A1 | 10/2015 | Jiang |
| 2015/0346317 A1 | 12/2015 | Patel |
| 2016/0021498 A1 | 1/2016 | Patel et al. |
| 2016/0025498 A1 | 1/2016 | Le Grand |
| 2016/0080911 A1* | 3/2016 | Kay ........................ H04W 4/04 455/456.1 |
| 2016/0178726 A1 | 6/2016 | Wirola et al. |
| 2016/0198431 A1 | 7/2016 | Pattabiraman et al. |
| 2016/0295372 A1* | 10/2016 | Kapicioglu ........... H04W 64/00 |
| 2017/0006434 A1 | 1/2017 | Howe |
| 2017/0131409 A1* | 5/2017 | Irish ....................... G01S 19/42 |
| 2017/0134910 A1 | 5/2017 | Gu et al. |
| 2017/0295458 A1 | 10/2017 | Gao et al. |
| 2017/0343639 A1 | 11/2017 | Ivanov |
| 2018/0025500 A1 | 1/2018 | Nielsen |
| 2018/0025649 A1 | 1/2018 | Contreras et al. |
| 2018/0035258 A1 | 2/2018 | Pon et al. |
| 2018/0109910 A1* | 4/2018 | Cerchio ................. H04W 4/33 |
| 2018/0275261 A1 | 9/2018 | Khan |
| 2018/0302751 A1 | 10/2018 | Coutinho et al. |
| 2018/0348333 A1 | 12/2018 | Bhatti et al. |
| 2019/0041488 A1 | 2/2019 | Ivanov |

FOREIGN PATENT DOCUMENTS

| | | |
|---|---|---|
| WO | WO 2011/144968 | 11/2011 |
| WO | WO 2014113882 | 7/2014 |
| WO | WO 2016206717 | 12/2016 |

* cited by examiner

EXTENDING A RADIO MAP

CROSS-REFERENCE TO RELATED APPLICATION

This application claims priority under 35 USC § 119(e) to U.S. Patent Application Ser. No. 62/514,239, filed on Jun. 2, 2017, the entire content of which are hereby incorporated by reference.

TECHNICAL FIELD

The disclosure generally relates to extending a radio map.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places where a mobile device does not have a line of sight with GPS satellites, GPS location determination can be error prone. For example, a conventional mobile device often fails to determine a location based on GPS signals when the device is inside a building or tunnel. In addition, even if a mobile device has lines of sight with multiple GPS satellites, error margin of GPS location can be in the order of tens of meters. Such error margin may be too large for determining on which floor of a building the mobile device is located, and in which room of the floor the mobile device is located.

SUMMARY

In one aspect, in general, a method includes receiving a radio map of an indoor venue using survey data collected by a survey device positioned throughout the venue. The radio map includes a boundary. The method also includes obtaining harvest data that correspond to locations that are outside of the boundary. The method also includes filtering the harvest data. The method also includes extending the radio map using the survey data and the filtered harvest data. The extended radio map is defined at least in part by an extension of the boundary.

Implementations may include one or more of the following features.

In some implementations, the survey data includes, for each of a plurality of reference points located inside the venue, received signal strength indicator (RSSI) measurements of wireless signals received by the survey device from a plurality of access points positioned in or proximate to the venue when the survey device is positioned at the respective reference point.

In some implementations, the harvest data includes, for each of a plurality of locations outside the venue, RSSI measurements of wireless signals received by a mobile device from a plurality of access points positioned in or proximate to the venue when the mobile device is positioned at the respective location outside the venue.

In some implementations, each element of harvest data includes a GPS location that corresponds to one of the plurality of locations outside the venue.

In some implementations, the locations that are outside of the boundary of the radio map are exterior to the venue.

In some implementations, the locations that are outside of the boundary of the radio map are interior to the venue.

In some implementations, the locations that are outside of the boundary and interior to the venue include locations for which survey data is not collected.

In some implementations, the locations for which survey data is not collected include locations that are restricted from being accessed by an operator of the survey device.

In some implementations, filtering the harvest data includes removing, from the harvest data, harvest data elements that are associated with a horizontal error that exceeds a threshold.

In some implementations, the threshold is 20 meters.

In some implementations, filtering the harvest data includes removing, from the harvest data, harvest data elements that are identified as being indoor data based on a comparison of latitude and longitude coordinates of the harvest data elements and latitude and longitude coordinates of the radio map.

In some implementations, filtering the harvest data includes determining whether an element of harvest data is identified as being outdoor data. Filtering the harvest data also includes comparing RSSI measurements associated with the element of harvest data to RSSI probability distributions associated with the survey data. Filtering the harvest data also includes, based on the comparing, determining whether the element of harvest data was likely obtained by a device positioned inside the venue when the element of harvest data was recorded. Filtering the harvest data also includes, if the element of harvest data is determined to have likely been obtained by the device positioned inside the venue when the element of harvest data was recorded, removing, from the harvest data, the harvest data element.

In some implementations, the RSSI probability distributions associated with the survey data are Rayleigh distributions.

In some implementations, receiving the radio map includes, for each of the plurality of reference points located inside the venue, creating an RSSI probability distribution for each of the plurality of access points. Each RSSI probability distribution is a probability distribution of the RSSI measurements of the wireless signals received from the respective access point when the survey device is positioned at the respective reference point.

In some implementations, the RSSI probability distributions are Rayleigh distributions.

In some implementations, extending the radio map includes, for each of the plurality of locations outside the venue, creating an RSSI probability distribution for each of the plurality of access points. Each RSSI probability distribution is a probability distribution of the RSSI measurements of the wireless signals received from the respective access point when the mobile device is positioned at the respective location outside the venue.

In some implementations, the extension of the boundary of the extended radio map surrounds each of the plurality of locations outside the venue.

In some implementations, filtering the harvest data comprises removing, from the harvest data, harvest data elements that do not fit one or more of the RSSI probability distributions created for each of the plurality of locations outside the venue.

In another aspect, in general, a system includes one or more processors, and at least one non-transitory device storing computing instructions operable to cause the one or more processors to perform operations including receiving a radio map of an indoor venue using survey data collected by a survey device positioned throughout the venue. The radio map includes a boundary. The operations also include obtaining harvest data that correspond to locations that are outside of the boundary. The operations also include filtering the harvest data. The operations also include extending the radio map using the survey data and the filtered harvest data. The extended radio map is defined at least in part by an extension of the boundary.

In another aspect, in general, at least one non-transitory storage device stores computer instructions operable to cause one or more processors to perform operations including receiving a radio map of an indoor venue using survey data collected by a survey device positioned throughout the venue. The radio map includes a boundary. The operations also include obtaining harvest data that correspond to locations that are outside of the boundary. The operations also include filtering the harvest data. The operations also include extending the radio map using the survey data and the filtered harvest data. The extended radio map is defined at least in part by an extension of the boundary.

Particular implementations may provide one or more of the following advantages.

In some implementations, the extended radio map allows the same positioning technique that was utilized for determining the indoor location of the device to be used to determine the outdoor location of the device (e.g., as the user travels from outside to inside or inside to outside). Therefore, the device can seamlessly transition from an indoor surveyed location to an outdoor unsurveyed location while still maintaining the ability to determine its location to an acceptable level of accuracy. For example, when the mobile device leaves an indoor venue to return outdoors, the location of the mobile device through the transition from indoors to outdoors can be accurately determined while the mobile device remains proximate to the venue (e.g., in a street or sidewalk next to the venue, in a parking lot, etc.). Once the mobile device is no longer proximate to the venue (e.g., as the user drives to a new destination), the mobile device may once again rely on conventional GPS positioning techniques to determine its location.

In some implementations, harvest data (e.g., harvest GPS data) can be used to extend the radio map. Filtering the harvest data before supplementing the survey data with the harvest data can ensure that the harvest data does not negatively affect the integrity of the database in which the survey data is stored. For example, harvest data elements that are determined to be unreliable can be removed before inclusion in the database.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
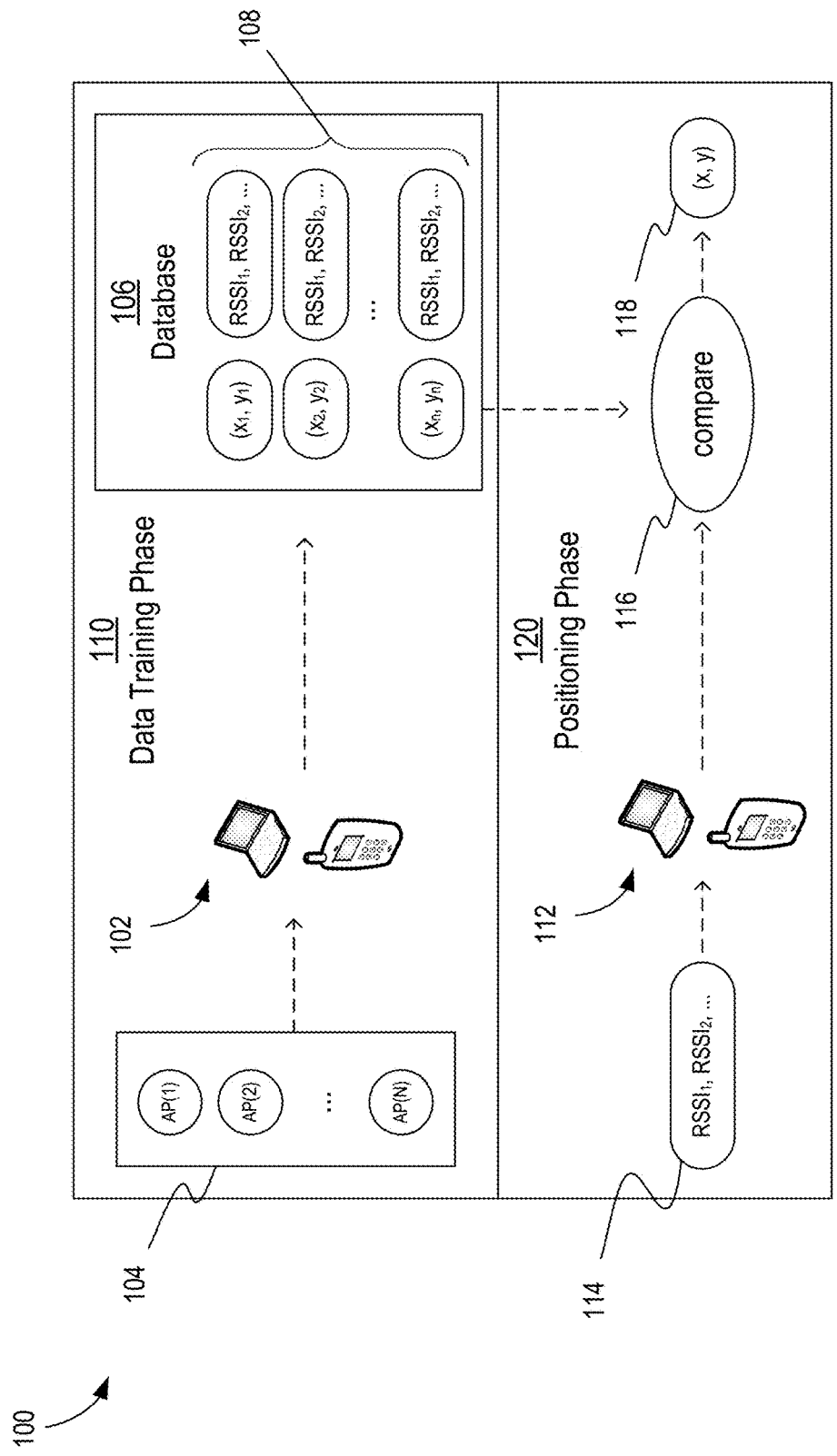
FIG. 1 is a block diagram illustrating a surveying technique for determining positioning.

Indoor positioning systems can use wireless local-area network (WLAN) (e.g., Wi-Fi) infrastructure to allow a mobile device to determine its position in an indoor venue. Such Wi-Fi-based positioning systems typically involve at least two phases—a data training phase and a positioning phase. During the data training phase (e.g., sometimes referred to as the surveying phase), a mobile survey device is positioned at various reference points throughout the venue. In some implementations, the reference points are predetermined locations within the venue for which positioning information is desired. The predetermined locations (e.g., for which the data training phase is performed) can later be identified as a current location of a device when a subsequent positioning phase is performed on the device. In some implementations, the actual locations of the reference points may not be predetermined, but may instead be determined according to one or more rules and/or criteria. For example, a first reference point may be defined at a particular location of the venue (e.g., at an entrance of the venue), and additional reference points may be defined at a particular distance interval (e.g., every 10 meters) in one or more particular directions, as described in more detail below.

An operator of the survey device (e.g., a surveyor) may travel to a first reference point within the venue and provide an input on a user interface of the survey device to indicate the position of the first reference point relative to the venue. For example, the surveyor may drop a pin on an indoor map representation of the venue. The surveyor may then cause the survey device to gather a plurality of measurements. In particular, the survey device determines all access points (APs) (e.g., wireless APs) that the survey device is in communication with and measures the received signal strength indicators (RSSIs) of each of the signals received from each of the APs. For each reference point, a plurality (e.g., hundreds) of RSSI measurements are obtained for each AP. Measurements may be obtained at a set interval (e.g., every few seconds). Measurements may be obtained over multiple days and under different conditions, such as under different climate conditions, different venue conditions (e.g., when the venue is highly populated, slightly populated, and unpopulated), different times of day, different physical venue conditions (e.g., different combinations of doors and/or windows within the venue being open or closed, etc.). The measurements are used to determine a characteristic feature of the first reference point. The surveyor may then travel to a second reference point and repeat the procedure, and so on until a comprehensive number of reference points within the venue have been gathered. The full set of measurements for all APs at all reference points within the venue are stored in a database (e.g., a fingerprint database). The collection of measurements is sometimes referred to as a "location fingerprint" of the venue. At this stage, the location fingerprint of the venue may largely be an indoor location fingerprint. In other words, the location fingerprint corresponds to reference points that reside inside the venue. Further, at this stage, the location data included in the database is largely survey data (e.g., measurements obtained by the survey device during the data training phase).

The positioning phase occurs after the training phase has at least partially been completed. During the positioning phase, a mobile device (e.g., a mobile device separate from the survey device) at a particular location within the venue may attempt to determine its location. The mobile device performs a scan of all APs in communication range of the mobile device and obtains RSSI measurements for signals received from each AP. The RSSI measurements are compared to the various measurements included in the location fingerprint and a match is determined. For example, the RSSI measurements obtained by the mobile device may be similar to the RSSI measurements that were obtained by the survey device at a particular reference point, and as such, the mobile device may determine that it is located at the particular reference point. The mobile device may identify the location that corresponds to the particular reference point (e.g., the location that was dropped as a pin on the map by the surveyor) and provide that particular location as the current location of the mobile device. Additional details about the matching process are described below. Such matching techniques typically employ a "probabilistic approach" in which the mobile device determines the reference point for which there exists the highest probability that the mobile device is located at.

The data training phase and the positioning phase are sometimes collectively referred to as a surveying technique for determining indoor positioning. The location fingerprint obtained by the survey device can generally be referred to as survey data. Such surveying techniques typically provide an accurate estimation of the location of the mobile device within the venue. However, one disadvantage of such surveying techniques is that they require the prior surveying (e.g., data training) of a venue. If a particular portion of a venue is not surveyed (e.g., in other words, if no reference point data is obtained for locations at or proximate to a particular portion of a venue), then it may be difficult to determine the location of the mobile device when the mobile device is located proximate to such areas, or in some cases, the location determination may be relatively inaccurate. Such shortcomings may exist when the mobile device is positioned near portions of the venue that are restricted to the surveyor (e.g., private rooms and/or stores, restricted access locations, etc.).

In some implementations, additional location data may be added to the fingerprint database to supplement the initial location fingerprint survey data. For example, harvest data that is obtained in and/or around the venue may be considered for addition to the fingerprint database. Such harvest data may be GPS data that identifies a location expressed as GPS coordinates (e.g., in latitude and longitude) and includes RSSI measurements for one or more of the APs observed during the data training phase. Harvest data is data that is obtained by enlisting a relatively large number of people, typically via an online medium. For example, users who run a particular operating system and/or application on their mobile device may contribute harvest GPS data to an operator of the operating system and/or application. The harvest data can be provided to services that can use the harvest data for various purposes. For example, a plurality of users may agree to contribute GPS data while running a mapping application on their mobile device. The GPS data from the plurality of users is collectively referred to as harvest data. An operator of a different service or application, such as an operator of an indoor positioning system, may receive the harvest data from an operator of the mapping application and use the harvest data to improve the indoor positioning system, as described herein.

The harvest data may undergo one or more filtering stages to ensure that the data added to the fingerprint database will have a positive effect (e.g., increase the accuracy of indoor location determinations for the mobile device). If the harvest data is determined to be suitable for addition, it is added to the fingerprint database. The harvest data may be added in a manner such that the harvest data has a similar schema as the survey data collected during the data collection phase by the survey device. The effect of adding such harvest data to the fingerprint database is that a radio map that represents the venue (which is described in more detail below) can be extended. In this way, the radio map may be extended to cover unsurveyed areas, including but not limited to indoor locations that were restricted to the surveyor, outdoor locations that are enclosed by the venue (e.g., atriums), and/or outdoor locations proximate to the venue (e.g., within approximately 25 meters of the outer boundary of the venue), thereby providing additional areas in and/or around the venue for which the location of a device can be determined with improved accuracy. Thus, when we talk about extending the radio map, we mean that devices located in the extended area may be able to accurately determine their respective outdoor location due to the inclusion of the harvest data.

FIG. 1 shows a block diagram illustrating a surveying technique 100 for determining positioning (e.g., indoor positioning within a venue). The technique 100 includes a data training phase 110 and a positioning phase 120.

During the data training phase 110, a survey device 102 (e.g., a mobile computing device such as a mobile phone, laptop, PDA, etc.) is positioned at various reference points throughout the venue. The survey device 102 may include a user interface that is configured to display a map representation of the venue. The venue map may be obtained from a venue map database. The venue map may include representations of multiple floors of the venue, including outer boundaries of the venue, indoor obstructions (e.g., walls), etc. When the survey device 102 is positioned at a particular reference point, an operator of the survey device 102 (e.g., a surveyor) can drop a pin on the venue map indicating the particular position of the reference point that is being tested. The position may be associated with an (x, y) coordinate which may, in some cases, correspond to latitude/longitude coordinates.

The surveyor can bring the survey device 102 to a first reference point within the venue. The reference point is a location within the venue for which a plurality of measurements (e.g., Wi-Fi measurements) is to be obtained. Characteristics of the measurements can be obtained and stored. At some later time, a mobile device (e.g., other than the survey device 102) may obtain measurements at the reference point or at a location proximate to the reference point. In general, and as described in more detail below, the characteristics of the measurements obtained by the mobile device can be compared to the characteristics of the stored measurements that were obtained by the survey device 102. If the characteristics are similar, the mobile device may determine that it is positioned at the first reference point.

The survey device 102 is positioned at various reference points throughout the venue. Also positioned throughout the venue are a plurality of access points (APs) 104. The APs 104 may be radio frequency (RF) signal transmitters that allow Wi-Fi compliant devices to connect to a network, and in some cases, the APs 104 may be part of Wi-Fi routers. At each reference point, the survey device 102 may connect to (e.g., transmit wireless signals between) each of a plurality of APs 104. The survey device 102 measures one or more characteristics of the wireless signals received from each AP 104. For example, when the survey device 102 is positioned at the first reference point (e.g., $x_1$, $y_1$), the surveyor may drop a pin on the venue map displayed on the survey device 102 to indicate the location of the first reference point ($x_1$, $y_1$). The survey device 102 may be connected to four APs 104—AP(1), AP(2), AP(3), and AP(4). Each of the APs 104 may be associated with an identifier such as a media access control (MAC) address that the survey device 102 can use to identify the particular AP 104. The survey device 102 can measure characteristics of signals received from each AP 104, such as the received signal strength indicator (RSSI). The RSSI can be measured for multiple wireless signals received from each AP 104. The results are stored in a database 106. The database 106 is sometimes referred to as a fingerprint database, and the data stored in the database 106 is sometimes referred to as survey data.

A plurality of measurements may be obtained for each AP 104. For example, for each AP 104, a wireless signal may be received at set intervals (e.g., every second) and the RSSI may be measured for each wireless signal. The wireless signals may be received and the RSSI may be measured under different conditions. For example, tens or hundreds of measurements may be taken during a first period with the survey device 102 in a first orientation. The orientation of the survey device 102 may be adjusted, and additional measurements may be taken. Measurements may be taken when the venue is occupied with a relatively large number of people, when the venue is largely empty, when the venue is completely empty, etc. Measurements may be taken when indoor obstructions, doors, etc. are in various open/closed states. Measurements may be taken under different climate conditions. The measurements may be taken under such a wide variety of circumstances to provide a relatively large data set for the particular reference point that is comprehensive and includes the variety of circumstances that may exist when a mobile device subsequently tries to determine its location in the positioning phase 120.

Once a sufficient number of measurements are obtained for the first reference point that is located at ($x_1$, $y_1$), an entry 108 for the first reference point ($x_1$, $y_1$) is stored in the database 106. The entry 108 (e.g., sometimes referred to as an element of survey data) includes the coordinates of the reference point and the various RSSI measurements for each of the APs 104. The survey device 102 can be positioned at a second reference point ($x_2$, $y_2$), and a similar process can be repeated to obtain an entry 108 for the second reference point ($x_2$, $y_2$), which can likewise be stored in the database 106. The collection of entries 108 stored in the database 106 is sometimes referred to as the "location fingerprint" of the venue.

The positioning phase 120 occurs after at least some of the location fingerprint of the venue (e.g., the entries 108 stored in the database 106) has been obtained. During the positioning phase 120, a mobile device 112 (e.g., which is typically different than the survey device 102) that is located at the venue may attempt to determine its location. In a similar fashion as that described above with respect to the data training phase 110, the mobile device 112 receives wireless signals from one or more of the APs 104 positioned throughout the venue. The mobile device 112 can measure characteristics of the received wireless signals. For example, the mobile device 112 may obtain RSSI measurements 114 of wireless signals received from each of the various APs 104. The RSSI measurements 114 are compared 116 to the location fingerprint (e.g., the survey data) stored in the database 106, and based on the comparison, a location 118 of the mobile device 112 is determined.

Multiple different techniques may be used for comparing 116 the location fingerprint stored in the database 106 to the RSSI measurements 114. In some implementations, a probabilistic approach is used. The location fingerprint (e.g., the plurality of data included in the various entries 108) can be used to create RSSI probability distributions of all APs 104 at all reference points.

Figure 2:
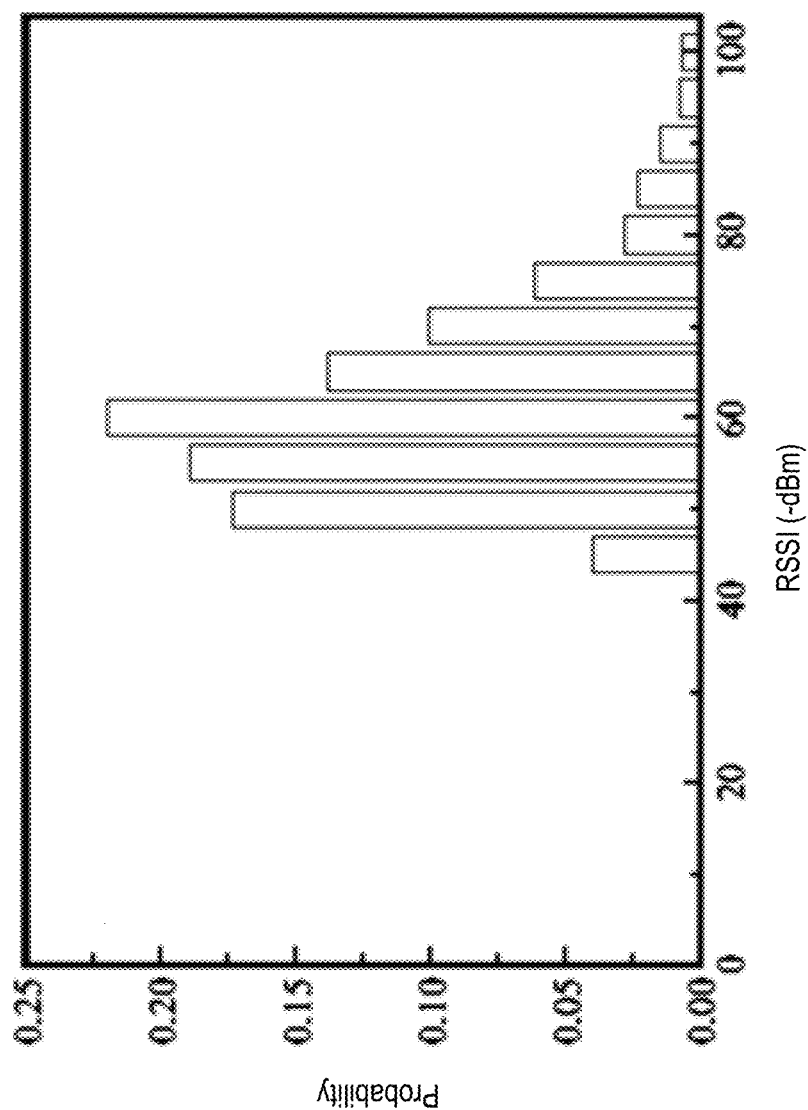
FIG. 2 shows an example of an RSSI probability distribution graph used in the surveying technique of FIG. 1.

FIG. 2 shows an example of an RSSI probability distribution graph 200 that includes, for example, all RSSI measurements (e.g., which are included in the entries 108 stored in database 106) obtained from one of the APs 104 (e.g., AP(1)) at the first reference point ($x_1$, $y_1$). In other words, while FIG. 1 shows that the database 106 includes a single RSSI measurement for AP(1) at the first reference point ($x_1$, $y_1$), which is denoted at $RSSI_1$ in the first entry 108, in practice, a relatively large number of RSSI measurements are typically taken and included in the database 106.

The various RSSI measurements taken during the data training phase 110 can be used to infer a probability that a device positioned at or near the particular reference point ($x_1$, $y_1$) will receive a signal having a particular RSSI value from the particular AP(1). In this example, the RSSI probability distribution graph 200 may include hundreds of RSSI measurements that were obtained by the survey device 102 based on wireless signals received from AP(1) when the survey device 102 was positioned at the first reference point ($x_1$, $y_1$). The number of measurements taken during the data training phase 110 having the various particular RSSI values corresponds to the probability that a future measurement taken by a device (e.g., the mobile device 112) will have the various particular RSSI values when the device is positioned at the first reference point ($x_1$, $y_1$).

In this example, the RSSI probability distribution graph 200 indicates that a device positioned at the first reference point ($x_1$, $y_1$) should most often receive a wireless signal from AP(1) that has an RSSI value of about 60-dBm. In particular, a device positioned at the first reference point ($x_1$, $y_1$) should receive a wireless signal from AP(1) that has an RSSI value of about 60-dBm about 22% of the time. Therefore, during the positioning phase 120, if the mobile device 112 receives a wireless signal from AP(1) that has an RSSI value of about 60-dBm, there is a reasonable probability that the mobile device 112 is located at the first reference point ($x_1$, $y_1$).

In practice, the probabilistic approach typically includes other considerations than the brief example described above. For example, the RSSI probability distribution graph 200 shown in FIG. 2 only corresponds to a single one of the APs 104 at a single one of the reference points. In practice, the RSSI probability distributions for all APs 104 at all reference points will be determined and stored in the database 106. When the position of the mobile device 112 is determined during the positioning phase 120 by comparing 116 the location fingerprint (e.g., expressed as RSSI probability distributions) to the RSSI measurements 114, a plurality of comparisons 116 are performed to find a match (e.g., the best match). For example, the RSSI measurement 114 that corresponds to AP(1) (e.g., $RSSI_1$) is compared to the RSSI probability distributions for AP(1) for each of the reference points, the RSSI measurement 114 that corresponds to AP(2) (e.g., $RSSI_2$) is compared to the RSSI probability distributions for AP(2) for each of the reference points, etc., and a collective comparison 116 is performed to determine the best collective match.

In some implementations, a weighted averaging technique may be used for the collective comparison 116 to determine the best collective match. For a particular comparison 116, each of the APs 104 may be assigned a level of importance. The APs 104 of relatively higher importance are weighted more heavily in the weighted average, and the APs 104 of relatively lower importance are weighted less heavily in the weighted average. For example, if a particular AP 104 (e.g., AP(5)) is assigned the highest level of importance, and the RSSI measurement 114 that corresponds to AP(5) (e.g., $RSSI_5$) very closely matches the RSSI probability distribution for AP(5) at a particular reference point, then there may be a high likelihood that the particular reference point is chosen as the best match. On the other hand, if a particular AP 104 (e.g., AP(8)) is assigned the lowest level of importance, then even if the RSSI measurement 114 that corresponds to AP(8) (e.g., $RSSI_8$) very closely matches the RSSI probability distribution for AP(8) at a particular reference point, the match may have a minimal effect on the comparison decision, and there may be a low likelihood that the particular reference point is chosen as the best match.

In some implementations, the level of importance used in the weighted average may be based at least in part on the magnitude of the RSSI measurements 114 that correspond to the various APs 104. For example, it may be inferred that stronger RSSI measurements 114 are more accurate because the user is likely closer to those corresponding APs 104. Therefore, the APs 104 that correspond to the stronger RSSI measurements 114 may be more heavily weighted in the weighted average.

Figure 3:
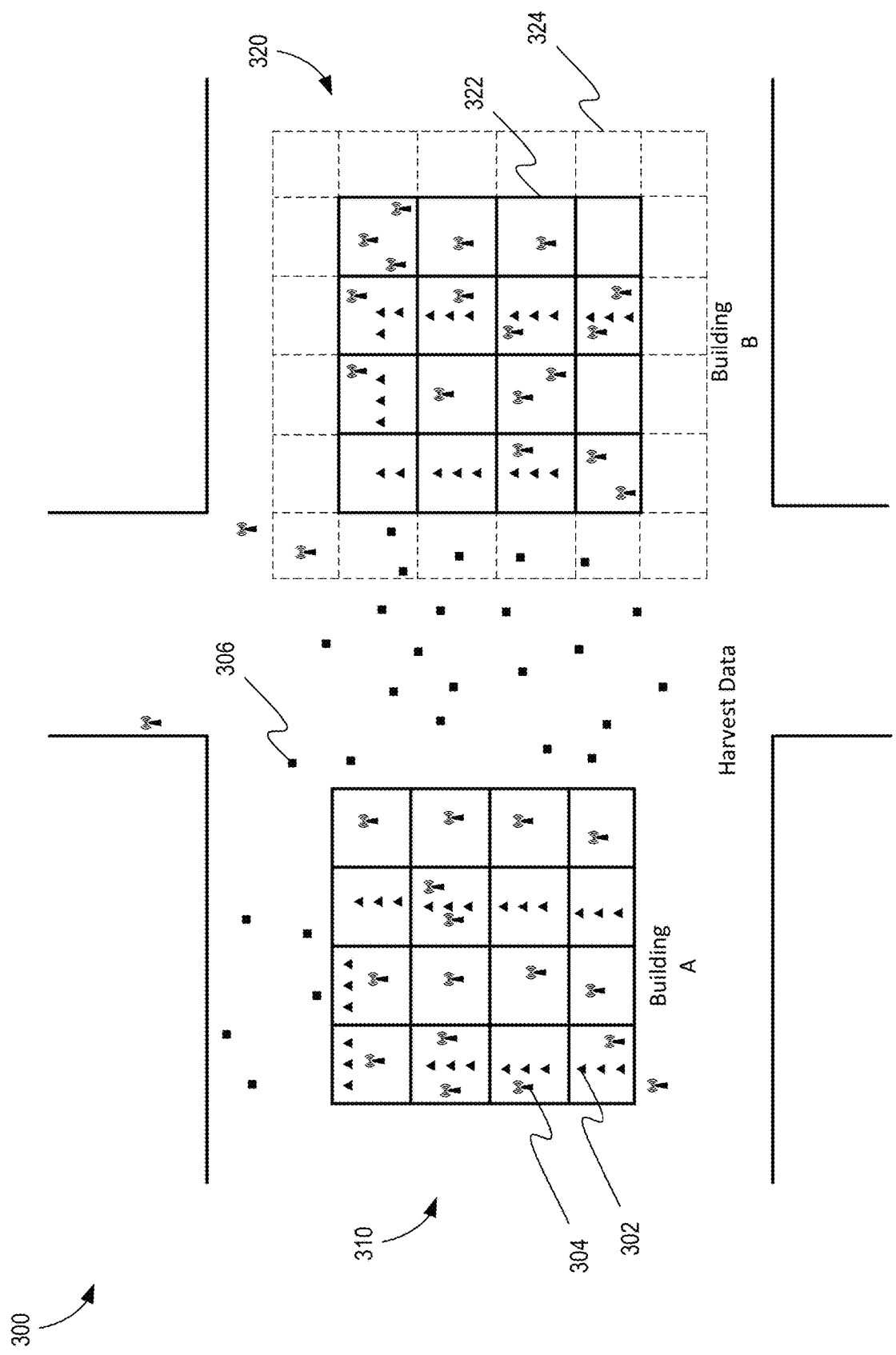
FIG. 3 shows an example of a map that includes a radio map for a first venue and a radio map for a second venue.

In some implementations, the venue and areas in proximity to the venue may be expressed as a graphical map, sometimes referred to as a radio map. The radio map is associated with the collection of location fingerprint data obtained during the data training phase 110, as well as other location data, as described in more detail below. The term radio map originates from the association of the graphical map with such location data that is based on characteristics of radio signals (e.g., Wi-Fi signals). FIG. 3 shows an example of a map 300 that includes a radio map 310 for a first venue (e.g., Building A) and a radio map 320 for a second venue (e.g., Building B). The surveying technique described above with respect to FIG. 1 may be employed in each of the venues.

During the data training phase 110, a surveyor may bring a survey device (e.g., the survey device 102 of FIG. 1) to each of a plurality of reference points 302, represented as black triangles in the illustration. The survey device 102 may include a user interface that is configured to display the radio map 310, 320 (or, e.g., a modified version of the radio map). Once the surveyor is positioned at the particular reference point 302, he or she may provide an input through the user interface (e.g., a touch input) to indicate the location of the reference point 302 to be tested. For example, the surveyor may drag and drop a pin on to the radio map 310, 320 to indicate the particular reference point 302 at which the survey device 102 is currently positioned.

A plurality of APs 304 (e.g., such as the APs 104 of FIG. 1) may be distributed throughout each of the buildings and outside of the buildings. Once the survey device 102 is positioned at the particular reference point 302 to be tested, the survey device 102 may obtain a plurality of measurements from the various APs 304. For example, the survey device 102 may perform a scan to determine which APs 304 the survey device 102 is in wireless communication with. If the survey device 102 receives one or more signals from a particular AP 304, the survey device 102 can record an identifier for the AP 304 (e.g., such as a MAC address) and also take measurements of a characteristic of the signal (e.g., such as an RSSI measurement). The data can be stored in a database (e.g., 106 of FIG. 1), the surveyor can bring the survey device 102 to the next reference point 302, and the process can be repeated until data for each desired reference point 302 is obtained.

In some implementations, the surveyor may follow a predetermined path and obtain data for reference points 302 at a particular distance interval (e.g., every 10 meters). For example, the surveyor may obtain data for a first reference point 302 when the surveyor first enters Building A. The surveyor may then begin walking down a hallway and obtain data for a second reference point 302 after walking approximately 10 meters. Data for reference points 302 can continue to be obtained in this fashion as the surveyor walks along various paths within Building A, including traveling to different floors within the building. In some implementations, the surveyor may gather data for a number of reference points 302 such that sufficient coverage of the venue is obtained. In general, the more reference points 302 for which data is obtained within a venue, the more accurate the subsequent positioning phase (e.g., 120 of FIG. 1) can be.

Focusing on Building A, the radio map 310 includes a grid of solid cells 322. The outer border of the grid represents the outer wall of the venue. The interior of the venue is broken down into the various cells. In some implementations, the cells may have uniform dimensions, e.g., 25 meters by 25 meters. The radio map 310 for Building A represents a radio map 310 that would typically be employed in existing indoor positioning techniques. For example, the radio map 310 covers only the interior or Building A. In other words, because data is not obtained for any reference points 302 that are positioned outside of the confines of Building A, if a device were positioned outside of Building A during the subsequent positioning phase 120, the surveying technique would have a difficult time accurately determining the position of the device. In particular, the RSSI measurements obtained by the device when the device is outside of Building A may be too dissimilar to the location fingerprint survey data stored in the database 106 to result in a match to any reference point 302. Therefore, existing positioning techniques are sometimes only able to determine the indoor position of devices.

In some implementations, it may be beneficial to extend the radio map (e.g., the radio map 320 for Building B). For example, the radio map 320 for Building B may be extended to cover areas for which survey data was not obtained. In the illustrated example, the extension for the radio map 320 is represented as hashed cells 324 of the grid that reside outside of Building B. However, in some implementations, the radio map 320 may be extended in other ways to cover different areas that were not surveyed, such as areas inside Building B to which access was restricted for the surveyor, or other areas for which different location data could be obtained and used to extend the radio map 320.

In addition to the reference points 302 for which survey data was obtained, there exist other locations for which additional location data can be obtained. For example, harvest data 306, represented as black squares in the illustration, may be obtained for areas in and/or around the venue. In some implementations, the harvest data 306 may be GPS data that identifies a location expressed as a GPS coordinate (e.g., as a latitude and longitude) and includes RSSI measurements for one or more of the APs 304. After one or more filtering stages, which are described in more detail below, the harvest data 306 may be added to the existing location fingerprint survey data that is stored in the database 106 to supplement the survey data. Thereafter, during the positioning phase 120, the location of the device when the device is positioned at or near unsurveyed areas may be determined. When we talk about extending the radio map 320, we mean that devices located in the extended area may be able to accurately determine their respective outdoor location due to the inclusion of the additional location data.

As described above, the location fingerprint survey data correlates the various reference points 302 to RSSI measurements from the various APs 304. Thus, when a device attempts to determine its location during the positioning phase 120, RSSI measurements for the various APS 304 are obtained, the RSSI measurements are compared to the location fingerprint survey data, and the reference point 302 that has corresponding survey data that provides a match to the RSSI measurements is returned as the likeliest location of the device. The harvest data 306 may be added to the database 106 such that the form of the harvest data is similar to the form of the survey data. In particular, each element of harvest data 306 may include, among other things, a location (e.g., a GPS location), identifiers for the various APs 304 from which wireless signals are received, an RSSI measurement for each of the wireless signals, and a horizontal error. The harvest data 306 may be obtained from devices that belong to the general public. The devices may need to "opt in" to provide the harvest data 306.

In a similar fashion as described above with respect to the location fingerprint "survey" data, each element of harvest data 306 may have an associated fingerprint that is based on the RSSI measurements for each of the APs 304. For example, the harvest data 306 may indicate that a device positioned at the particular GPS coordinates detected wireless signals for a particular set of APs 304 having particular RSSI values. During a subsequent positioning phase 120, a device that receives wireless signals from the same APs 304 having the same or similar RSSI values may determine that the device is likely located at the same GPS coordinates. Therefore, the harvest data 306 can essentially serve as additional "survey data" (while not technically survey data in the sense that it was not obtained by a survey device during surveying of the venue) for subsequent use during a positing phase 120. In some implementations, the harvest data 306 is considered for addition to the location fingerprint survey data stored in the database 106 if at least some of the APs 304 from which the RSSI measurements are obtained match at least some of the APs 304 that correspond to the survey data.

While survey data is typically very accurate and reliable, GPS data sometimes includes significant errors. For example, survey data is typically very accurate because the location that corresponds to each reference point was manually input but a human user. Such locations can typically be trusted as being accurate because the locations can be input on a map representation of the venue in the manner described above. For example, a surveyor standing at a hallway intersection within the venue can drop a pin directly on the same hallway intersection on the map representation of the venue. On the other hand, in general, GPS data is prone to inaccuracies that are not present in survey data. Therefore, before the harvest data 306 is added to the location fingerprint survey data stored in the database 106, the harvest data 306 is filtered (e.g., according to the process illustrated in FIG. 5) to ensure that the harvest data 306 that is added to the database 106 is accurate and reliable. Otherwise, inaccurate harvest data 306 may negatively affect the location positioning technique by reducing its overall accuracy rather than positively supplementing the location positioning technique by effectively extending the radio map 320.

Figure 4:
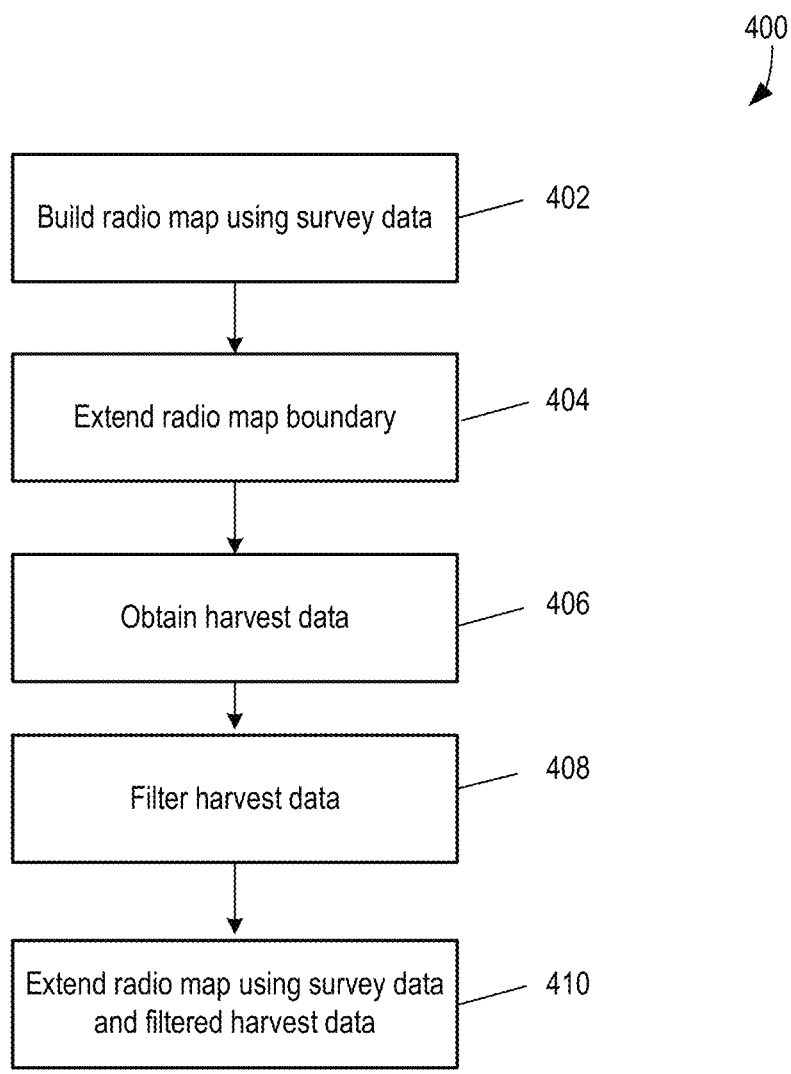
FIG. 4 is a flowchart of an exemplary process of extending a radio map including obtaining and filtering harvest data.

FIG. 4 is a flowchart of an exemplary process 400 of extending a radio map (e.g., the radio map 320 for Building B of FIG. 3). The process 400 can be performed, for example, by the electronic device (e.g., a server) described with respect to FIG. 7, or the computing device (e.g., a mobile computing device) described with respect to FIG. 8. At step 402, a radio map (e.g., an indoor radio map) is built using the survey data (e.g., indoor survey data). Referring to the radio map 320 for Building B as an example, the initial radio map 320 is shown as the solid cells 322. The outer perimeter of the grid represents an outer boundary of Building B. Because the initial radio map 320 is built using indoor survey data, the radio map 320 currently covers the indoor footprint of Building B. In particular, the radio map 320 includes data for indoor reference points 302.

At step 404, a boundary of the radio map 320 (e.g., the outer perimeter of the solid cells 322) is extended. For example, the radio map 320 may be extended such that the radio map 320 covers locations that are outside of Building B. The extended area of the radio map 320 is represented as the hashed cells 324 of the grid. In some implementations, the radio map 320 is extended by a fixed amount such as 25 meters, although other distances may be used. At this point, the extension of the radio map 320 to cover outdoor locations means that location data that corresponds to locations that reside within the extended area may be considered for addition to the location fingerprint survey data.

At step 406, harvest data (e.g., the harvest data 306 of FIG. 3) is obtained. The harvest data 306 is co-located harvest data 306. In other words, the obtained harvest data 306 corresponds to locations proximate to the radio map 320. In some implementations, harvest data 306 is considered co-located with the radio map 320 and the venue if the harvest data 306 corresponds to locations within a fixed distance of a portion of the venue. For example, the co-located harvest data 306 that is obtained and considered may correspond to locations that are within approximately 100 meters of a portion of the venue.

As described above, the harvest data 306 may be harvest GPS data. Each element of harvest data 306 may include, among other things, a location (e.g., a GPS location), identifiers for the various APs 304 from which wireless signals are received, an RSSI measurement for each of the wireless signals, and a horizontal error. In some implementations, the GPS location may be represented as a latitude and longitude. In some implementations, the GPS location may be converted into an (x, y) location such that the harvest data 306 can be easily correlated to the survey data.

At step 408, the harvest data 306 is filtered. For example, before the co-located harvest data 306 is added to the database 106 to supplement the survey data, it is filtered according to one or more filtering steps to ensure that the harvest data 306 is suitable for addition. The filtering steps are described in detail below with respect to FIG. 5.

At step 410, the radio map 320 is extended using both the survey data and the filtered harvest data 306. For example, once it is determined that the various pieces of harvest data 306 are suitable for addition to the database 106, the harvest data 306 is added to the database 106 in a schema similar to the survey data already stored in the database 106. Because the harvest data 306 corresponds to locations beyond the outer boundary of Building B and the original radio map 320, addition of such harvest data 306 has the effect of building an extended radio map 320 that covers such outdoor locations. In other words, devices that are subsequently located at such outdoor locations may be able to determine their outdoor location with acceptable accuracy.

Extending the radio map 320 to include filtered harvest data 306 may provide a number of advantages. Existing positioning techniques are typically relatively accurate for determining indoor positioning of a device inside a venue. However, as the device transitions from outside the venue to inside the venue, or from inside the venue to outside the venue, the device may have a difficult time providing an accurate location. For example, a user moving within a venue may be able to accurately determine the location of the device while the device remains indoors. Once the user walks outside, the radio map (e.g., the radio map 310 that corresponds to Building A) may not provide coverage for positioning using survey data. At that point, the device may need to rely on GPS data to identify its location. However, GPS data has inherent inaccuracies, and therefore, the determined position of the device based on GPS data may not achieve a suitable level of accuracy.

When the radio map is extended (e.g., such as the radio map 320 that corresponds to Building B) in the manner described above, the same positioning technique that was utilized for determining the indoor location of the device inside the venue can continue to be used as the user travels outside. In this case, while the extended radio map 320 relies on GPS data, the GPS data is supplemented with additional information—in particular, the RSSI of the various APs that the device is in communication with. Further, the GPS data is filtered to ensure its suitability for inclusion in the location fingerprint (as described in more detail below). Therefore, the device can seamlessly transition from an indoor surveyed location to an outdoor unsurveyed location while still maintaining the ability to determine its location to an acceptable level of accuracy.

In some cases, harvest data may be unsuitable for supplementing the survey data for a number of reasons. If unsuitable harvest data is added to the survey data, the net effect may be to reduce the overall accuracy of the location determination system. Therefore, the harvest data must be examined prior to inclusion to ensure that it will allow for extension of the radio map without negatively impacting the accuracy of the system. Thus, the harvest data is filtered.

Figure 5:
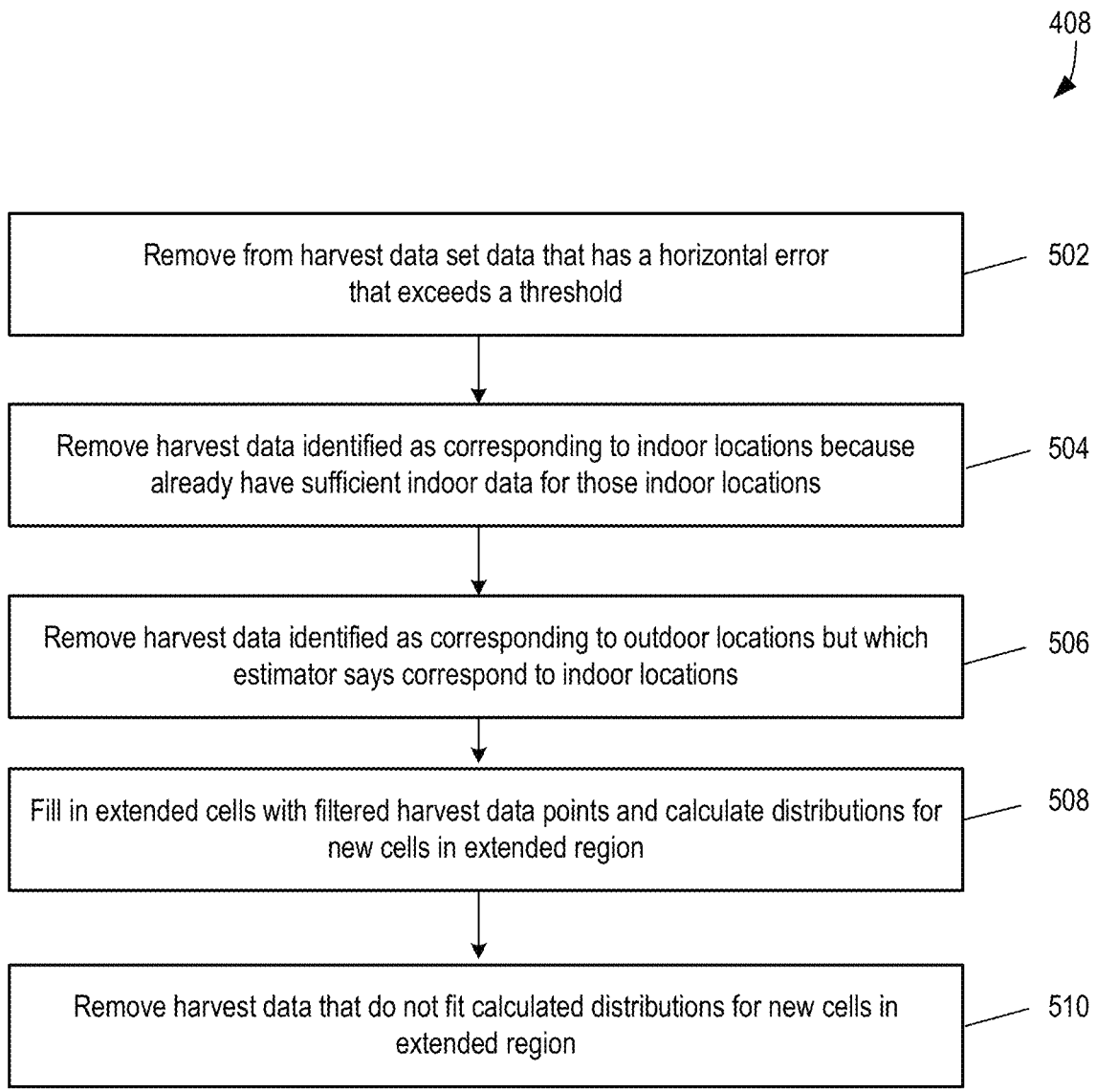
FIG. 5 is a flowchart of an exemplary process of filtering the harvest data described in FIG. 4.

FIG. 5 is a flowchart of an exemplary process of filtering the harvest data (e.g., step 408 of FIG. 4). At step 502, data that has a horizontal error that exceeds a threshold is removed. As described above, each element of harvest data may include a location and a horizontal error. The horizontal error represents the potential error that may exist in the GPS location. For example, for a given GPS location provided in an element of harvest data, the horizontal error represents the radius of a circle surrounding the provided GPS location within which the actual location where the element of harvest data was obtained may reside. A horizontal error of 20 meters means that the actual location of the device when the element of harvest data was obtained may be within 20 meters of the GPS location provided in the element of harvest data. Harvest data that has a horizontal error beyond a predetermined threshold (e.g., 20 meters) may be initially filtered from the full set of harvest data. In some implementations, the threshold is adjustable (e.g., tunable).

Harvest data having relatively large horizontal error may be unsuitable for inclusion in the database because the locations provided in such harvest data cannot be trusted to an acceptable level of accuracy. For example, suppose an element of harvest data has a horizontal error of 50 meters. In a worst case scenario, the GPS location provided in the harvest data may be 50 meters from the actual location of the device when the harvest data was provided. Such a difference in the actual vs. the recorded location can result in drastically different RSSI measurements obtained from various APs. In some implementations, a difference of 50 meters may result in the device receiving wireless signals from a very different set of APs than expected. In a subsequent positioning phase in which the position of a device is determined, if the obtained RSSI measurements substantially match the RSSI measurements that correspond to the harvest data, the system may indicate that the device is at the recorded location in the harvest data, but in reality, such RSSI measurements may actually correspond to a location that is 50 meters away. Inclusion of such data can reduce the overall accuracy of the system, and as such, it is filtered out.

At step 504, harvest data that correspond to indoor locations are removed if there already exists sufficient indoor data for those locations. As described above, each element of harvest data may include a GPS location represented as a latitude and longitude. The harvest data can be post-processed such that latitude and longitude coordinates of the various GPS locations are compared to latitude and longitude coordinates of the radio map. If a particular element of harvest data has latitude and longitude coordinates that correspond to an indoor location (e.g., the latitude and longitude coordinates reside within the radio map), then the particular element of harvest data is identified as being indoor data. While GPS data is typically obtained in outdoor locations, GPS signals can also propagate indoors, so there exist circumstances in which an element of harvest data corresponds to an indoor location.

As mentioned above, survey data is typically significantly more accurate than GPS data. Therefore, if a particular indoor location includes sufficient coverage by survey data, and an element of harvest data corresponds to the particular indoor location (e.g., by having GPS coordinates that correspond to a surveyed reference point), such harvest data may be filtered out. While the harvest data may (or may not) be accurate, filtering out the harvest data without further analysis may be appropriate because a sufficient level of accuracy may be provided by the unsupplemented survey data. Therefore, there may be no reason to risk including inaccurate harvest data if accuracy cannot be improved through its inclusion (or can only be minimally improved under best case scenarios).

At step 506, harvest data that correspond to outdoor locations, but for which the estimator says correspond to indoor locations, are removed. In some implementations, the identified location (e.g., as being "indoors" or "outdoors") for an element of harvest data may be incorrect. That is, the comparison of the GPS coordinates of the element of harvest data with the coordinates of the radio map may indicate that the element of harvest data was obtained outdoors, but it may have actually been obtained indoors. In such circumstances, the harvest data should be removed. To determine whether a particular element of harvest data that is identified as being outdoors is actually indoors, the estimator (e.g., the RSSI probability distributions based on the survey data) may be run on the element of harvest data. If the RSSI values provided in the harvest data substantially match the RSSI probability distributions that correspond to a survey reference point at or proximate to the location provided in the harvest data, it may be determined that the harvest data, despite being identified as outdoors via comparison with the coordinates of the radio map, is likely indoor data (e.g., the element of harvest data was likely obtained by a device that was positioned inside the venue when the element of harvest data was recorded). Under such circumstances, the particular element of harvest data is filtered out. In some implementations, the results of the estimator being run on the element of harvest data may be used to improve the RSSI probability distributions that correspond to the survey reference points, such that an accuracy subsequent determinations can be improved.

To illustrate the filtering that occurs at step 506, suppose an element of harvest data is identified as being outdoors via the comparison with the coordinates of the radio map. The GPS location identified in the harvest data may point to a location outside of the outer boundary of the radio map (e.g., outside of the particular venue). If the element of harvest data is in fact outdoors, then the RSSI values of wireless signals received from various APs may be significantly different than the RSSI probability distributions that correspond to survey reference points (e.g., indoor survey reference points) even if such reference points are spatially close to the GPS location. Such differences may exist because the RSSI values may be significantly impacted by the exterior wall of the venue. If the RSSI values of the harvest data are significantly different than the RSSI probability distributions that correspond to nearby indoor survey reference points, then the harvest data is likely, in fact, outdoor data, and as such, should be included in the database (e.g., not filtered out). On the other hand, if the RSSI values of the harvest data are similar to the RSSI probability distributions that correspond to nearby indoor survey reference points, then the harvest data is likely incorrectly identified as being outdoors. Therefore, such harvest data should be filtered out There may be multiple reasons for filtering out harvest data that is identified as outdoors but is actually indoor data. For reasons similar to those described above with respect to step 504, indoor harvest data is typically filtered out because survey data likely already covers such areas on the radio map. Because survey data is generally more accurate that GPS data, there is no need to potentially contaminate the database with potentially-inaccurate GPS data when other, better data exists. In some examples, harvest data that is incorrectly identified as outdoor data should be filtered out because such data may correspond to an outdoor GPS location, yet the actual location of the device when such data was obtained was indoors. By including such harvest data in the database, a device that is indoors which obtains RSSI values similar to those included in the harvest data may incorrectly determine its position as being outside (e.g., at the GPS location) when, in fact, the device is located indoors. Such incorrectly-identified harvest data may have the effect of "pulling" devices outdoors (e.g., calculating a location for a device as being outdoors) when they are in fact indoors. In general, for determining indoor positions of devices, it is desirable to rely on the more-accurate survey data rather than potentially-inaccurate harvest data, especially when possible errors in the harvest data have been identified. Therefore, such incorrectly-identified harvest data is removed.

At step 508, the extended cells of the radio map are filled in with the filtered harvest data points, and distributions for the new cells in the extended regions are calculated. Referring briefly to FIG. 1, when the RSSI measurements 114 obtained by the mobile device 112 during the positioning phase 120 are compared to the survey data (e.g., the location fingerprint) stored in the database, a probabilistic approach may be used. The location fingerprint (e.g., the plurality of data included in the various entries 108) can be used to create RSSI probability distributions of all APs 104 at all reference points. Once the harvest data has been filtered and determined to be suitable for inclusion in the database 106, such data can also be used to create RSSI probability distributions for all APs 104 at the various locations (e.g., GPS locations) included in the harvest data. Such GPS locations included in the harvest data are positioned outside of the venue in the new cells of the extended regions of the radio map (e.g., such as the hashed cells 324 of the radio map 320 for Building B in FIG. 3). Therefore, adding the filtered harvest data to the database 106 and creating RSSI probability distributions for the locations included in the harvest data has the effect of extending the radio map 320. Thereafter, during the positioning phase 120, a device can accurately determine its location both when the device is inside the venue (e.g., largely using RSSI probability distributions created based on the survey data) as well as when the device is outside of the venue (e.g., using RSSI probability distributions created based on the survey data and the harvest data).

In some implementations, the RSSI probability distributions are created according to a Rayleigh distribution, although other distributions may be used. In some implementations, Rayleigh distributions have been shown as being particularly suitable for characterizing probabilities of RSSI values of wireless signals (e.g., multipath wireless signals). For example, a Rayleigh distribution may provide an acceptable fit (e.g., the best fit) for the survey data obtained during the data training phase and/or the harvest data. As such, creating RSSI probability distributions according to a Rayleigh distribution may result in an improved ability to estimate the location of the device.

Figure 6:
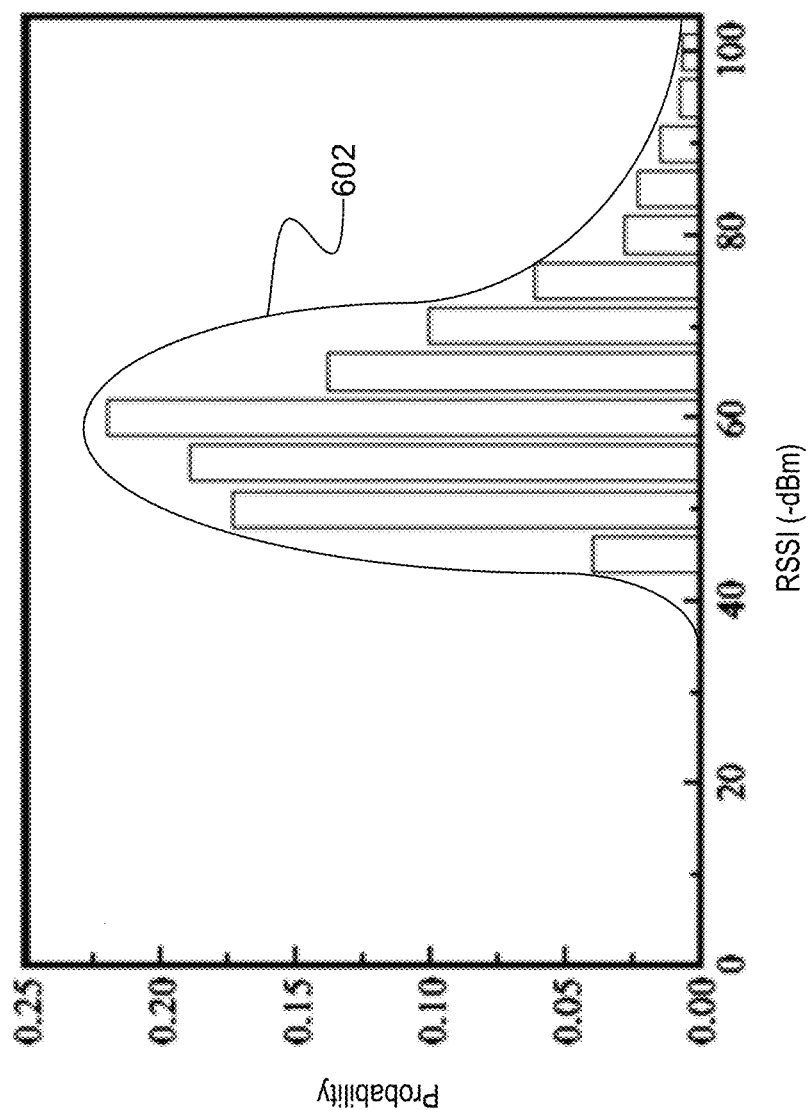
FIG. 6 shows an example of an RSSI probability distribution graph according to a Rayleigh distribution.

Once distributions (e.g., Rayleigh distributions) for the new cells in the extended region have been calculated and the extended cells have been filled in with the filtered harvest data, any pieces of harvest data that do not fit the calculated distributions are removed. FIG. 6 shows an example of an RSSI probability distribution graph 600 according to a Rayleigh distribution 602 that may be created based on the filtered harvest data. In this example, the RSSI probability distribution graph 600 corresponds to RSSI values of signals received from a particular AP when the device was positioned at the location identified in the harvest data. In general, RSSI measurements obtained from the particular AP when devices are positioned at the particular location are expected to fall within the Rayleigh distribution 602. Harvest data that do not fit the Rayleigh distribution 602 may be filtered out.

At step 510, harvest data that do not fit the calculated distributions (e.g., the Rayleigh distribution 602) for the new cells in the extended regions of the radio map are removed. For example, if an element of harvest data resides outside of the curve defined by the Rayleigh distribution 602, that element of harvest data is not added to the database (or, e.g., if the particular element of harvest data has already been included in the database, it is removed). Such harvest data is considered outlier data because it does not conform to the expected characteristics of data obtained from the particular location. Once the harvest data has been sufficiently filtered and added to the location fingerprint, the extended radio map including survey data and filtered harvest data may be completed.

While a "probabilistic approach" has largely been described as being used for comparing the location fingerprint stored in the database 106 to the RSSI measurements 114 (e.g., the comparing 116 of FIG. 1) to determine the location of the mobile device 112, other techniques may alternatively or additionally be used. In some implementations, a nearest neighbor test is used in which the RSSI measurements 114 are compared to the survey data (e.g., the RSSI measurements for each of the APs 104). The Euclidean distance between the RSSI measurements 114 and each reference point fingerprint is determined, and the reference point corresponding to the smallest Euclidean distance is determined to be the likely (x, y) location of the mobile device 112.

This disclosure describes various Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

While the venue has largely been described as being a mall, other venues may be surveyed by the survey device to create a radio map to be extended. The venue may be an indoor venue (e.g., a restaurant, a shopping complex, a convention center, an indoor sports or concert stadium, a movie theater, a parking lot, etc.) or an outdoor venue (e.g., a street, an outdoor sports or concert stadium, an amusement park, a fair, a carnival, a park, a national park, a canyon, a valley, a collection of hiking trails, a parking garage, etc.). In some implementations, the venue may be aboveground or belowground (e.g., a belowground parking garage or a belowground shopping complex). In some implementations, the venue is a location that is not able to receive sufficiently accurate GPS signals. Therefore, the venue may be an outdoor location that includes obstructions to GPS signals (e.g., a crowded city block, a canyon, etc.).

While the RSSI measurements (e.g., for each AP at each reference point) are largely described as being fit to a Rayleigh distribution, other probability distributions having different probability density functions can also or alternatively be used. For example, in some implementations, one or more of a Uniform (e.g., Continuous) probability distribution, a Gaussian probability distribution, and a Ricean probability distribution may be used, among others. In some implementations, one or more aspects of any combination of the Rayleigh, Uniform, Gaussian, and Ricean probability density functions may be included in the probability density function that is used.

While the radio map (e.g., an initial version of the radio map) has been largely described as being obtained by taking RSSI measurements of Wi-Fi signals received from various APs, one or more other wireless protocols may be employed instead of or in addition to Wi-Fi. For example, in some implementations, the survey device may be configured to obtain RSS measurements for Bluetooth signals received when the survey device is positioned at various reference points. The Bluetooth signals may be received from various Bluetooth transmitter located throughout and/or proximate to a venue. Such RSSI measurements of the Bluetooth signals may be used, either alone or in combination with the Wi-Fi data, to generate the location fingerprint of the venue.

While the survey data has largely been described as being obtained by a survey device that measures characteristics of Wi-Fi signals, other types of data may be used as "source data." In other words, survey data is one example of the type of source data that can be used to build the initial radio map. In general, the source data has a relatively high degree of accuracy and can be trusted as corresponding to the true location of the device. In the examples largely described above, the survey data has a relatively high degree of accuracy because the locations that correspond to each reference point are manually input by a human user. In some implementations, survey data may be "truth data" obtained from truth sources (e.g., sources that are known to provide location data having a relatively high degree of accuracy, such as user-input data). In this way, rather than the initial radio map being built based on survey data, the initial radio map may be received, download, and/or built using other high quality data from other truth sources. In some implementations, the high quality data may be high quality GPS data (e.g., which may be determined based on the horizontal error associated with the GPS data).

While the radio map (e.g., an initial version of the radio map) has been largely described as being obtained by a survey device that measures a plurality of RSSIs from various APs at various reference points (e.g., provided as surveyor-entered positions), the radio map may be obtained in other ways (e.g., from other source data). In some implementations, the radio map may be previously obtained and subsequently extended according to the techniques described herein. For example, the radio map may be obtained (e.g., downloaded) from a database of radio maps (e.g., that were previously built) or otherwise provided.

While the radio map has largely been described as being obtained for an indoor venue, a similar process can be applied to build a radio map for an outdoor location. For example, outdoor locations can sometimes rely on GPS data to accurately determine a position of a device. However, some outdoor locations may have characteristics that result in inaccurate position determination using GPS. For example, city streets may have surrounding buildings that impede/obscure line of site of GPS signals, thereby causing difficulty in determining position using GPS. In rural areas, natural barriers (e.g., canyons, valleys, etc.) may similarly impede GPS signals. In such locations, a surveying technique may be used to building a radio map. Or, for example, one or more other techniques may be used for building a radio map (e.g., using other truth data).

Similarly, in some implementations, indoor venues may not require a surveying technique to build a radio map. For example, an indoor location may have a glass roof or some other characteristic that allows GPS signals to sufficiently cover the venue. In such circumstances, GPS data may be identified as being of relatively high accuracy such that the GPS data can be accepted as truth data. In some implementations, such GPS data can be used to build the radio map. In general, outdoor locations may have characteristics similar to typical indoor locations, and indoor locations may have characteristics similar to typical outdoor locations, such that the technique described herein as largely applying to indoor locations can likewise be applied to outdoor locations, and vice versa.

While the radio map has largely been described as being extended by extending a boundary of the radio map, the radio map may be extended in other ways. In general, extending the radio map involves using information related to explored areas of the radio map to determine information about unexplored areas of the radio map. For example, the explored areas of the radio map may represent areas within and/or proximate to the venue for which a location can be determined at a relatively high level of accuracy using source data (e.g., survey data). Such locations, in combination with additional data (e.g., harvest GPS data), can be used to extend the radio map into unexplored areas. In this way, the radio map can be extended into unexplored areas without necessarily extending a border of the radio map.

In some implementations, less than all of the APs that are identified in the harvest data may be included in the data that is added to the database. For example, if a particular AP that is identified in the harvest data does not have a threshold number of observations (e.g., if a threshold number of RSSI measurements are not obtained for the particular AP), the particular AP may be omitted from the data that is added to the database. Similarly, if a particular AP is identified as being too old (e.g., which can be determined based on the identifier of the AP), the AP may be omitted.

In some implementations, the harvest data may be filtered based on a time at which the harvest data was obtained. For example, harvest data that was collected outside of a particular time window may be omitted, or harvest data that was collected within a particular time window may be omitted. In some implementations, the harvest data may be filtered based on a quantity of the harvest data. For example, harvest data beyond a threshold quantity may be filtered, or harvest data may be required to satisfy a threshold quantity before the harvest data is used to extend the radio map.

In some implementations, the harvest data may be filtered such that data that corresponds to a particular AP omitted from the data that is added to the database if a determination is made that the particular AP is moving (e.g., transient). In some implementations, the RSSI measurements that correspond to the particular AP may indicate that the particular AP is moving (or, e.g., has moved relative to the location of the AP during the data training phase). In some implementations, one or more other (e.g., external) systems may indicate that the particular AP is moving, in which case the particular AP may be omitted from the data added to the database.

In some implementations, filtering the harvest data may include one or more outlier detection techniques that are known in the art. Such outlier detection techniques may be other than those specifically described herein.

Example System Architecture

Figure 7:
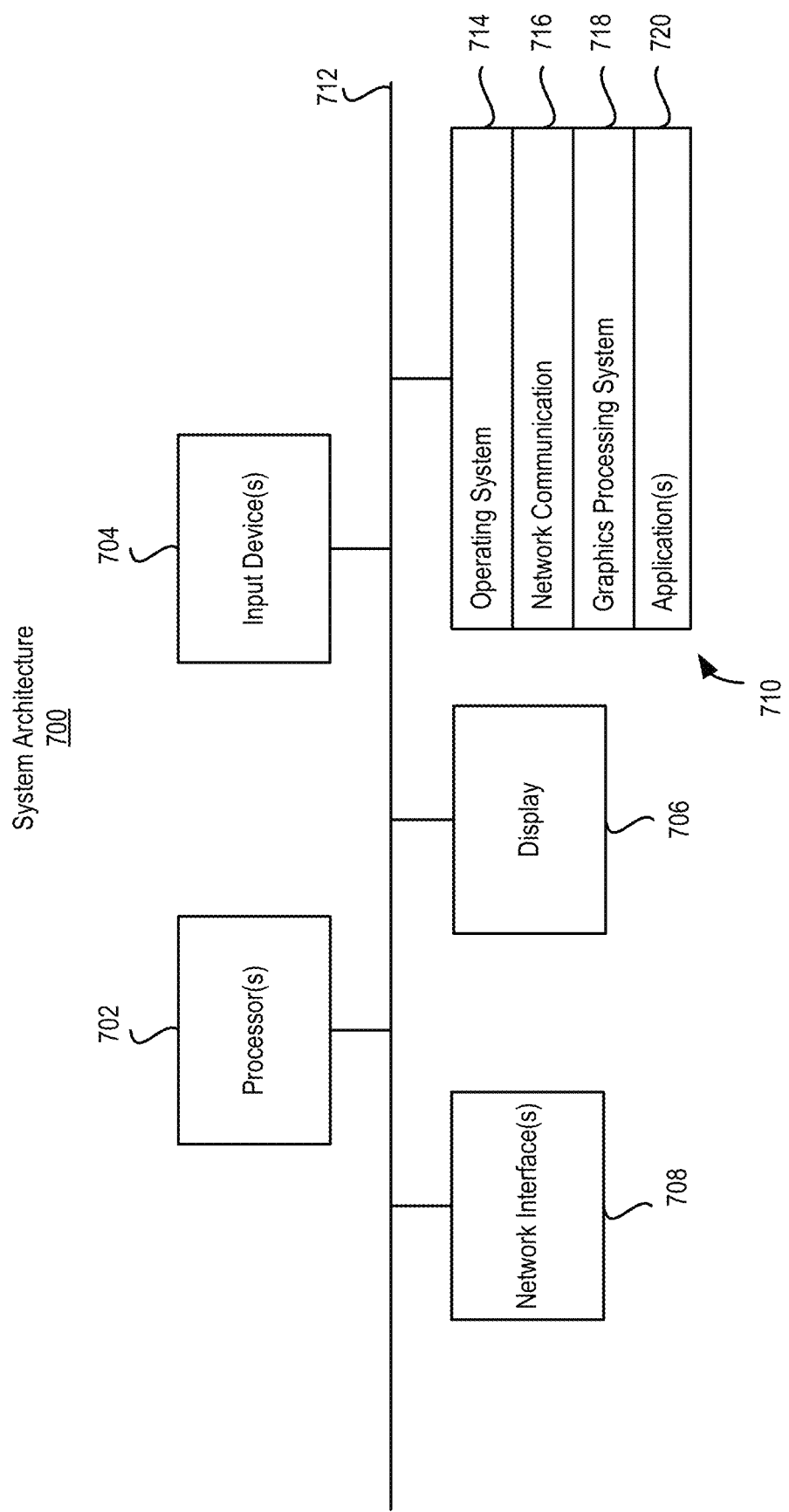
FIG. 7 is a block diagram of an exemplary system architecture of an electronic device implementing the features and operations described in reference to FIGS. 1-6.

FIG. 7 is a block diagram of an exemplary system architecture of an electronic device implementing the features and processes of FIGS. 1-6. The architecture 700 can be implemented on any electronic device that runs software applications derived from compiled instructions, including without limitation personal computers, servers, smart phones, media players, electronic tablets, game consoles, email devices, etc. In some implementations, the architecture 700 can include one or more processors 702, one or more input devices 704, one or more display devices 706, one or more network interfaces 708 and one or more computer-readable mediums 710. Each of these components can be coupled by bus 712.

Display device 706 can be any known display technology, including but not limited to display devices using Liquid Crystal Display (LCD) or Light Emitting Diode (LED) technology. Processor(s) 702 can use any known processor technology, including but are not limited to graphics processors and multi-core processors.

Input device 704 can be any known input device technology, including but not limited to a keyboard (including a virtual keyboard), mouse, track ball, and touch-sensitive pad or display. In some implementations, the input device 704 could include a microphone that facilitates voice-enabled functions, such as speech-to-text, speaker recognition, voice replication, digital recording, and telephony functions. The input device 704 can be configured to facilitate processing voice commands, voiceprinting and voice authentication. In some implementations, audio recorded by the input device 704 is transmitted to an external resource for processing. For example, voice commands recorded by the input device 704 may be transmitted to a network resource such as a network server which performs voice recognition on the voice commands.

Bus 712 can be any known internal or external bus technology, including but not limited to ISA, EISA, PCI, PCI Express, NuBus, USB, Serial ATA or FireWire.

Computer-readable medium 710 can be any medium that participates in providing instructions to processor(s) 702 for execution, including without limitation, non-volatile storage media (e.g., optical disks, magnetic disks, flash drives, etc.) or volatile media (e.g., SDRAM, ROM, etc.).

Computer-readable medium 710 can include various instructions 714 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 can establish and maintain network connections (e.g., software for implementing communication protocols, such as TCP/IP, HTTP, Ethernet, etc.).

A graphics processing system 718 can include instructions that provide graphics and image processing capabilities. For example, the graphics processing system 718 can implement the processes described with reference to FIGS. 1-6.

Application(s) 720 can be an application that uses or implements the processes described in reference to FIGS. 1-6. The processes can also be implemented in operating system 714.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Example Mobile Device Architecture

Figure 8:
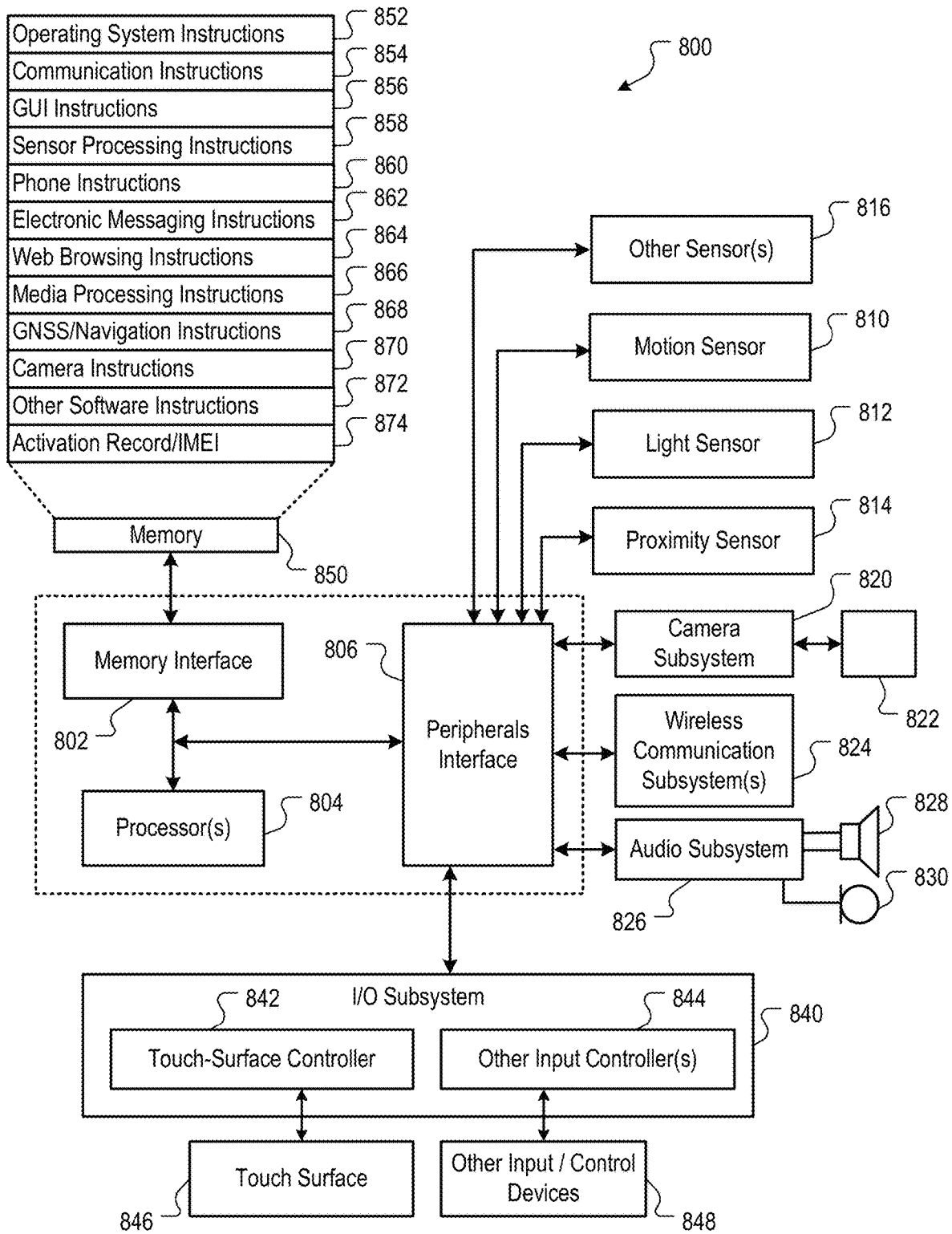
FIG. 8 is a block diagram of an exemplary device architecture of a computing device implementing the features and operations described in reference to FIGS. 1-6.

FIG. 8 is a block diagram of an exemplary device architecture of a computing device 800, such as a mobile device, that can implement the features and operations described in reference to FIGS. 1-6. For example, the survey device (102 of FIG. 1) and/or the mobile device (112 of FIG. 1) may be examples of the computing device 800. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 800 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication. In some implementations, the microphone 830 facilitates voice-enabled functions, such as speech-to-text, speaker recognition, voice replication, digital recording, and telephony functions. The audio subsystem 826 can be configured to facilitate processing voice commands, voiceprinting and voice authentication. In some implementations, audio recorded by the audio subsystem 826 is transmitted to an external resource for processing. For example, voice commands recorded by the audio subsystem 826 may be transmitted to a network resource such as a network server which performs voice recognition on the voice commands.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™. The computing device 800 can, therefore, include a 36-pin connector that is compatible with the iPod. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing voice authentication. For example, operating system 852 can implement security lockout and voice authentication features.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and functions; and/or camera instructions 870 to facilitate camera-related processes and functions.

The memory 850 can store other software instructions 872 to facilitate other processes and functions, such as security and/or authentication processes and functions. For example, the software instructions can include instructions for performing voice authentication on a per application or per feature basis and for allowing a user to configure authentication requirements of each application or feature available on a device.

The memory 850 can also store other software instructions (not shown), such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) 874 or similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method comprising:
   receiving a radio map of a floor of an indoor venue using survey data collected by a survey device positioned throughout the floor of the venue, the radio map including a horizontal boundary encompassing positions at which the survey data was collected;
   obtaining harvest data that correspond to horizontal locations that are outside of the horizontal boundary, wherein the harvest data includes received signal strength indicator (RSSI) measurement data of wireless signals received by a mobile device from a plurality of access points positioned in or proximate to the venue when the mobile device is positioned at the horizontal locations that are outside the horizontal boundary and Global Positioning System (GPS) location data that corresponds to the horizontal locations that are outside the horizontal boundary;
   initially identifying at least one of the horizontal locations of the harvest data as an outdoor location via comparison of the GPS location data with coordinates of the radio map;
   filtering the harvest data to remove a portion of RSSI measurement data associated with the positions within the horizontal boundary based on a matching of the RSSI measurement data included in the harvest data to RSSI measurement data corresponding to the collected survey data and to remove a portion of the GPS location data that, based on a comparison of the GPS location data of the harvest data to latitude and longitude coordinates of the survey data, corresponds to horizontal locations having a horizontal error that exceed a threshold, wherein subsequent to the filtering, the GPS location data is correlated with the latitude and longitude coordinates of the survey data and the filtered horizontal locations of the harvest data are identified to be likely indoor locations; and
   extending, along a horizontal direction, the radio map using the survey data and the filtered harvest data, wherein the extended radio map is defined at least in part by an extension of the horizontal boundary that includes the filtered harvest data.

2. The method of claim 1, wherein the survey data includes, for each of the positions, received signal strength indicator (RSSI) measurements of wireless signals received by the survey device from the plurality of access points positioned in or proximate to the venue when the survey device is positioned at the respective position.

3. The method of claim 2, wherein receiving the radio map comprises, for each of the positions, creating an RSSI probability distribution for each of the plurality of access points, wherein each RSSI probability distribution is a probability distribution of the RSSI measurement data of the wireless signals received from the respective access point when the survey device is positioned at the respective position.

4. The method of claim 3, wherein the RSSI probability distributions are Rayleigh distributions.

5. The method of claim 1, wherein the horizontal locations that are outside of the horizontal boundary of the radio map are exterior to the venue.

6. The method of claim 1, wherein the horizontal locations that are outside of the horizontal boundary of the radio map are interior to the venue.

7. The method of claim 6, wherein the horizontal locations that are outside of the horizontal boundary and interior to the venue include locations for which survey data is not collected.

8. The method of claim 7, wherein the locations for which survey data is not collected include locations that are restricted from being accessed by an operator of the survey device.

9. The method of claim 1, wherein the threshold is 20 meters.

10. The method of claim 1, wherein filtering the harvest data to remove a portion of the RSSI measurement data associated with the positions within the horizontal boundary comprises removing, from the harvest data, harvest data elements that are identified as being indoor data based on a comparison of latitude and longitude coordinates of the harvest data elements and latitude and longitude coordinates of the survey data of the radio map.

11. The method of claim 1, wherein filtering the harvest data comprises:
    determining whether an element of harvest data is identified as being outdoor data;
    comparing RSSI measurement data associated with the element of harvest data to RSSI probability distributions associated with the survey data;
    based on the comparing, determining whether the element of harvest data was likely obtained by a device positioned inside the venue when the element of harvest data was recorded; and
    if the element of harvest data is determined to have likely been obtained by the device positioned inside the venue when the element of harvest data was recorded, removing, from the harvest data, the portion of the RSSI measurement data corresponding to the harvest data element.

12. The method of claim 11, wherein the RSSI probability distributions associated with the survey data are Rayleigh distributions.

13. The method of claim 1, wherein extending the radio map
    comprises, for each of the horizontal locations outside of the horizontal boundary of the venue, creating an RSSI probability distribution for each of the plurality of access points, wherein each RSSI probability distribution is a probability distribution of the RSSI measurement data of the wireless signals received from the respective access point when the mobile device is positioned at the respective horizontal location outside of the horizontal boundary of the venue.

14. The method of claim 13, wherein the extension of the boundary of the extended radio map surrounds each of the horizontal locations outside of the horizontal boundary of the venue.

15. The method of claim 13, wherein filtering the harvest data comprises removing, from the harvest data, harvest data elements that do not fit one or more of the RSSI probability distributions created for each of the horizontal locations outside of the horizontal boundary of the venue.

16. The method of claim 1, further comprising updating the radio map to include the horizontal locations associated with the filtered harvest data.

17. A system comprising:
one or more processors; and
at least one non-transitory device storing computing instructions operable to cause the one or more processors to perform operations comprising:
receiving a radio map of a floor of an indoor venue using survey data collected by a survey device positioned throughout the floor of the venue, the radio map including a horizontal boundary encompassing positions at which the survey data was collected;
obtaining harvest data that correspond to horizontal locations that are outside of the horizontal boundary, wherein the harvest data includes received signal strength indicator (RSSI) measurement data of wireless signals received by a mobile device from a plurality of access points positioned in or proximate to the venue when the mobile device is positioned at the horizontal locations that are outside the horizontal boundary and Global Positioning System (GPS) location data that corresponds to the horizontal locations that are outside the horizontal boundary;
initially identifying at least one of the horizontal locations of the harvest data as an outdoor location via comparison of the GPS location data with coordinates of the radio map;
filtering the harvest data to remove a portion of RSSI measurement data associated with the positions within the horizontal boundary based on a matching of the RSSI measurement data included in the harvest data to RSSI measurement data corresponding to the collected survey data and to remove a portion of the GPS location data that, based on a comparison of the GPS location data of the harvest data to latitude and longitude coordinates of the survey data, corresponds to horizontal locations having a horizontal error that exceed a threshold, wherein subsequent to the filtering, the GPS location data is correlated with the latitude and longitude coordinates of the survey data and the filtered horizontal locations of the harvest data are identified to be likely indoor locations; and extending, along a horizontal direction, the radio map using the survey data and the filtered harvest data, wherein the extended radio map is defined at least in part by an extension of the horizontal boundary that includes the filtered harvest data.

18. The system of claim 17, further comprising operations of updating the radio map to include the horizontal locations associated with the filtered harvest data.

19. At least one non-transitory storage device storing computer instructions operable to cause one or more processors to perform operations comprising:
receiving a radio map of a floor of an indoor venue using survey data collected by a survey device positioned throughout the floor of the venue, the radio map including a horizontal boundary encompassing positions at which the survey data was collected;
obtaining harvest data that correspond to horizontal locations that are outside of the horizontal boundary, wherein the harvest data includes received signal strength indicator (RSSI) measurement data of wireless signals received by a mobile device from a plurality of access points positioned in or proximate to the venue when the mobile device is positioned at the horizontal locations that are outside the horizontal boundary and Global Positioning System (GPS) location data that corresponds to the horizontal locations that are outside the horizontal boundary;
initially identifying at least one of the horizontal locations of the harvest data as an outdoor location via comparison of the GPS location data with coordinates of the radio map;
filtering the harvest data to remove a portion of RSSI measurement data associated with the positions within the horizontal boundary based on a matching of the RSSI measurement data included in the harvest data to RSSI measurement data corresponding to the collected survey data and to remove a portion of the GPS location data that, based on a comparison of the GPS location data of the harvest data to latitude and longitude coordinates of the survey data, corresponds to horizontal locations having a horizontal error that exceed a threshold, wherein subsequent to the filtering, the GPS location data is correlated with the latitude and longitude coordinates of the survey data and the filtered horizontal locations of the harvest data are identified to be likely indoor locations; and
extending, along a horizontal direction, the radio map using the survey data and the filtered harvest data, wherein the extended radio map is defined at least in part by an extension of the horizontal boundary that includes the filtered harvest data.

20. The non-transitory storage device of claim 19, further comprising operations of updating the radio map to include the horizontal locations associated with the filtered harvest data.

* * * * *